(12) United States Patent
Reinders

(10) Patent No.: US 7,238,105 B2
(45) Date of Patent: Jul. 3, 2007

(54) DEWPOINT COOLER DESIGNED AS A FRAME OR PART THEREOF

(75) Inventor: Johannes Antonius Maria Reinders, Warnsveld (NL)

(73) Assignee: Oxyoell Holding B.V., AC Raalte (NL)

( * ) Notice: Subject to any disclaimer, the term of this patent is extended or adjusted under 35 U.S.C. 154(b) by 104 days.

(21) Appl. No.: 10/512,449

(22) PCT Filed: Feb. 27, 2003

(86) PCT No.: PCT/NL03/00152

§ 371 (c)(1),
(2), (4) Date: Sep. 23, 2005

(87) PCT Pub. No.: WO03/091632

PCT Pub. Date: Nov. 6, 2003

(65) Prior Publication Data

US 2006/0086058 A1 Apr. 27, 2006

(30) Foreign Application Priority Data

Apr. 26, 2002 (NL) .................................... 1020481

(51) Int. Cl.
*E06B 7/02* (2006.01)
(52) U.S. Cl. ...................... 454/223; 454/198; 454/200
(58) Field of Classification Search ................ 454/196, 454/198, 200, 201, 211, 223
See application file for complete search history.

(56) References Cited

U.S. PATENT DOCUMENTS

| 1,622,131 | A | * | 3/1927 | Crispin | 261/80 |
| 4,094,935 | A | * | 6/1978 | Walker et al. | 261/80 |
| 4,351,781 | A | * | 9/1982 | Blatter | 261/29 |
| 4,386,038 | A | * | 5/1983 | Walker | 261/80 |
| 5,285,654 | A | * | 2/1994 | Ferdows | 62/309 |

* cited by examiner

*Primary Examiner*—Derek S. Boles
(74) *Attorney, Agent, or Firm*—David P. Owen; Howrey LLP

(57) ABSTRACT

A dewpoint cooler comprises: a first air circuit and a second air circuit coupled thereto via a heat-conducting wall, through which two circuits can flow two media, wherein the second medium contains a gas, heat-conducting wall break-up means for breaking up at least the thermal boundary layer (50), the laminar boundary layer and the relative humidity boundary layer in both media, which break-up means comprise heat-conducting protrusions; wherein the surfaces of said wall and the break-up means are covered with a hydrophilic coating, which can absorb an evaporable liquid, retain it and relinquish it again (100), such that the wetted coating, the heat-conducting surfaces and the break-up means are cooled. A wetting (150) unit for subjecting the secondary medium to wetting by the evaporable liquid such that evaporated liquid entrained by the secondary medium extracts heat from the primary medium via the wall.

9 Claims, 3 Drawing Sheets

DEWPOINT COOLER DESIGNED AS A FRAME OR PART THEREOF

The invention relates to a dewpoint cooler, comprising: a first air circuit and a second air circuit thermally coupled thereto via an at least partially heat-conducting wall, through which two circuits can flow two respective media, wherein at least the second medium contains a gas, for instance air, with a relative humidity of less than 100%; which heat-conducting wall has break-up means such as fins for breaking up at least the thermal boundary layer, the laminar boundary layer and the relative humidity boundary layer at the position of at least active zones in both media for heat transfer, which break-up means comprise heat-conducting protrusions which enlarge the effective heat-conducting surface area of said wall; wherein the heat-conducting surfaces of said wall and the break-up means are at least partially covered at least in the area of the secondary medium with a hydrophilic, for instance hygroscopic coating, which coating is for instance porous and/or can absorb water by capillary action, retain it and relinquish it again through evaporation, such that the wetted coating, and thereby also the heat-conducting surfaces and the break-up means, are cooled; primary drive means based on pressure difference, for instance a fan or pump, for the primary medium; secondary drive means based on pressure difference, for instance a fan, for the secondary medium; and a wetting unit for subjecting the secondary medium to wetting by the water by evaporating liquid from the coating such that the evaporated liquid entrained by the secondary medium extracts heat from the primary medium via the heat-conducting wall.

Such a dewpoint cooler is known.

The known dewpoint coolers are standalone devices generally having a form and dimensions which from an aesthetic viewpoint often leave something to be desired in an interior.

In this respect it is an object of the invention to provide a dewpoint cooler which is wholly integrated into the architectural structure of a building, and which is therefore practically invisible.

In this context the dewpoint cooler according to the invention is characterized by a housing in which the walls bounding the air circuits are accommodated, which housing is adapted as border or frame, or a part thereof, for an outside door or outside window of a building, wherein the inlet of the primary circuit and the outlet of the secondary circuit are situated on the outside and the outlet of the primary circuit and the inlet of the secondary circuit are situated on the inside.

The dewpoint cooler according to the invention is preferably embodied such that the coating consists of a porous technical ceramic material, for instance a burnt layer, a cement such as a Portland cement, or a fibrous material, for instance a mineral wool such as rockwool. With such a coating it is possible to achieve that the liquid applied to the coating by the wetting unit spreads rapidly in the coating while the coating has a substantial buffering capacity for the water.

It is important that the coating has a small thickness, for instance in the order of 50-100 Hm, such that the thermal resistance caused in the coating by the water is very small.

In a preferred embodiment the dewpoint cooler according to the invention has a reversing unit for reversing a part of the primary airflow at the outlet of the first air circuit in order to form the secondary airflow, wherein the primary drive means are also the secondary drive means.

The secondary airflow can for instance amount to about 30% of the introduced primary airflow, whereby the secondary airflow carried to the space for cooling then amounts to about 70% of the introduced primary airflow.

In a particular embodiment the dewpoint cooler can have the special feature that the reversing unit can be switched off such that the two airflows can be separated and the wetting means can be switched off, this such that the dewpoint cooler can operate as heat exchanger for recovering heat discharged to the outside by the secondary airflow through transfer of heat in the heat exchanger to the primary airflow.

In the summer for instance the dewpoint cooler can thus operate effectively as dewpoint cooler, while in the winter it operates as heat-recovering heat exchanger.

In yet another embodiment the dewpoint cooler has the special feature that the ratio between the primary airflow and the secondary airflow can be adjusted by means of adjusting means such that the efficiency of the dewpoint cooler is adjustable.

With such an embodiment it is possible to vary from the ratio of 30:70 stated above by way of example between the secondary cooling airflow and the cooled airflow supplied to the space. The optimization can take place with control means such that the dewpoint can be approached within a very small margin, for instance 1 C.

This latter variant can be embodied such that the adjusting means are embodied as an optionally adjustable through-feed in the primary circuit and an adjustable through-feed in the secondary circuit.

Alternatively, use can also be made of two separated fans for respectively the primary airflow and the secondary airflow.

A specific embodiment has the special feature that the fans are at least partly powered by a rechargeable battery which is charged by a solar panel collecting sunlight from the outside. Depending on the expected sunshine, the power supply from the rechargeable battery can be further assisted by additional mains supply.

The dewpoint cooler according to the invention can be further embodied such that it can be coupled in modular manner to a similar dewpoint cooler, for instance at an angle of 90.

The fans can for instance be supplied as separate blocks such that, when a number of dewpoint coolers according to the invention are coupled, use need only be made of a total of two fans.

The invention also relates to a building with at least one door and/or one window with a frame.

This building has the feature according to the invention that at least one of the borders of this frame is embodied as a dewpoint cooler in accordance with the above stated specifications.

The dewpoint cooler according to the invention is very cheap to manufacture and install, and combines the function of window frame with that of dewpoint cooler. The invention is therefore very practical when there is shortage of space.

The dewpoint cooler is further always embodied as independent or standalone unit, whereby it is possible to dispense with lines, cables and the like. A simple mains cable may well be necessary for power supply to the fans.

When old buildings are renovated the dewpoint cooler according to the invention can be utilized very successfully.

When frames are replaced, parts thereof, or at least specific borders, can be embodied as dewpoint coolers according to the invention. In this case it is also possible to dispense with the installation of expensive air-conditioning systems.

In buildings the concept of double flux and single flux is used in the case of a controlled ventilation. With a double flux there is a complete control of both the incoming and outgoing airflow. This is for instance the case in a dewpoint cooler, whether or not it be of the type according to the invention, wherein the building is hermetically sealed apart from the dewpoint cooler. In the case of a single flux there is a ventilation flow to the outside, wherein gaps, chinks and cracks provide the introduced air.

Window and door frames consist of a frame with profiles in aluminium, PVC, steel, wood or combinations thereof.

The dewpoint cooler according to the invention can be used in different positions. For an outside wall it can be vertical, in a pitched roof it can be arranged obliquely, in a horizontal roof it can be placed horizontally.

The dewpoint cooler according to the invention can be embodied as built-in border or surface-mounted border.

The housing can for instance be designed such that the dewpoint cooler fits therein by means of a snap system. The same applies for filters which may be applied for the primary and secondary airflow.

The dewpoint cooler according to the invention can be applied in any desired position and on any edge of a door or window. The following four options are particularly important: heat exchanger air/air, double flux—dewpoint cooler, single flux—dewpoint cooler, double flux—the combination of heat exchanger air/air, single or double flux.

It should be appreciated that the dewpoint cooler according to the invention can be a fully standalone unit and requires no coupling to other systems.

The airflow rate in both the primary and secondary circuits is preferably a minimum of 6 m3/h, but the flow rate can also be greater in accordance with the wishes of the user and the application. It is also necessary to consider whether the air-conditioning is total or partial.

The dewpoint cooler according to the invention can be embodied in double flux with equal flow rates, but also with different flow rates. In this manner the possibility can readily be created of ventilating for instance sanitary spaces with single flux.

Reference is made by way of example to the possibility of two rooms in a building being supplied from outside with 60 m3/h (primary circuit) while 50 m3/h is discharged. There then remains a surplus of 10 m3/h. Two rooms therefore give a surplus of 20 m3/h. By way of for instance cracks or holes in the door of a sanitary space this flow of 20 m3/h can be discharged to the outside by means of an additional sanitary space fan.

The dewpoint cooler according to the invention can also function as heat recovery heat exchanger by optionally reversing the fans or making use of a built-in automatic or controlled valve.

It will be apparent that the dewpoint cooler itself must be practically silent, for instance may not produce more noise than 38 dB (A) at a distance of 1 m.

In addition, the dewpoint cooler may only have a negligible sound transmission.

The dewpoint cooler may not, particularly in a gale, produce any noise nuisance in the form of whistling, sighing, rattling and so on.

Power supply preferably takes place at a maximum voltage of 48V direct current or alternating current. Below this value there is no specific safety norm in force, and low-voltage connecting means can be used, for instance mini-socket outlets.

These socket outlets can be important for, among others, the following aspects: power supply to the fans and possible electronic control means, remote control, adjustment, failure report or report of the measure of fouling, central closing in the case a stench wave occurs, central closing in the case a fire protection becomes operative, connection to buildings, management centre, burglar alarm and a frequency control system, which can optionally also be driven wirelessly. In the latter case it is possible to largely dispense with the use of lines, which will stimulate the standalone character of the dewpoint cooler according to the invention.

It is important to provide the dewpoint cooler with filters. On the one hand this is to prevent fouling of the dewpoint cooler itself, which could have an adverse effect on the heat transfer, on the other hand to prevent floating dirt and dust being carried for instance from outside to the inside and, conversely, from inside to the outside. The filters can be of per se known type and can preferably be embodied in the form of insert units such that they are easily replaceable.

In the case of a dewpoint cooler of the type according to the invention which is installed on a window frame, the operation of the fans has to be stopped at the moment the window is opened. A built-in magnetic contact can for instance be used for this purpose.

Use can further be made of a failure reporting means, for instance relating to the operation of the fans and possible fouling of the filters and the heat-exchanging surfaces.

Simple computer fans with low flow rate can be used as fans. A fan with a relatively high rotation speed can also be applied. As alternative it is possible to envisage the use of one drive motor with two fan blades, one for the primary circuit and one for the secondary circuit.

A bypass valve can be used for switching between winter operation with heat exchanger and summer operation without heat exchanger. In air-conditioning applications the heat exchanger is always used. A bypass valve is also suitable for preventing icing up. The bypass valve can be controlled for hand-operated or automatic deicing. During the free cooling period, particularly at nighttime, fresh outside air can be carried inside without heat exchange. This can optionally take place at an increased airflow rate, which will possibly be accompanied by a slightly increased noise production.

When two fans are used in the dewpoint cooler according to the invention, both circuits can then be used for this ventilation. An overpressure-relief valve can optionally be arranged elsewhere in the ventilated space for this purpose.

In the case of gale or other dramatic overpressure conditions, use can for instance be made of a non-return valve in the form of an air valve or the like. A very quickly responding air valve can for instance be based on the use of a table-tennis ball. Use can also be made of a protective plate to prevent the inlet and outlet being directly influenced on the outside. An air valve can also be based on a rubber bellows or other type of valve.

Protection against rainwater can take place with per se known protective measures, particularly covers.

Covering by curtains on the inside of a window with dewpoint coolers according to the invention in the vertical borders can be prevented by directing the blown-out airflow obliquely inward instead of perpendicularly of the main plane of the window. This prevents the curtains flapping too much.

The air from outside is also prevented from being blown inward ineffectively. Use can be made of one or more nozzles with adjustable angle. The flow rate of the airflow is also kept relatively low so as to prevent an undesirable increase in the k-factor of the pane in question.

Radiators are often placed under a window. In such a situation it is desirable to have the air discharge take place on the upper border. There is otherwise the danger of warm air from the radiator being drawn off.

When curtains are closed the air discharge must remove the air from the room. Account must therefore be taken of curtains in the placing of inlets and outlets. In the case of office buildings, where curtains are not usually applied, nozzles driven in oscillating manner can also be applied, whereby the air in question is properly spread through the space.

The invention will now be elucidated with reference to the annexed drawings of a random embodiment. In the drawings:

FIG. 1 shows a dewpoint cooler 1 embodied in this embodiment as heat exchanger, i.e. without wetting means, whereby the heat exchanger could operate according to the invention as dewpoint cooler.

Figure 1:
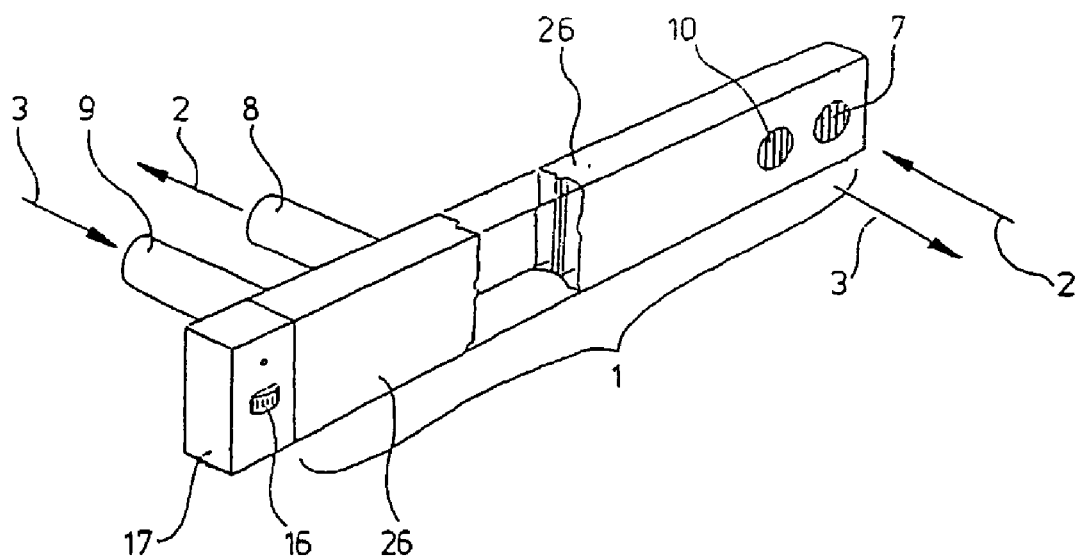
FIG. 1 shows a partly cut-away perspective view of a known dewpoint cooler.

Dewpoint cooler 1 comprises two very schematically shown sets of air through-flow channels which form respectively a primary circuit I and a secondary circuit II, through which two airflows 2 and 3 respectively can flow in heat-exchanging contact to be described hereinbelow. Between the channels drawn in this case as being single, generally the circuits I and II, is situated a heat-conducting wall 4 on which symbolically designated fins 5,6 are placed respectively in primary circuit I and secondary circuit II. These fins are manufactured for instance from copper and increase the effective heat-exchanging capacity of wall 4 considerably.

A housing 26 bounds the dewpoint cooler and co-acts sealingly with wall 4 such that circuits I and II are completely separated physically.

Housing 6 has four passages for the two circuits I, II, viz. inlet 7 of the primary circuit, outlet 8 of the primary circuit, inlet 9 of the secondary circuit and outlet 10 of the secondary circuit. Passages 8 and 9 are situated on the inside, thus in the space to be ventilated or conditioned, while passages 7,10 are situated on the outside, and are thus in contact with the ambient air.

A fan 11 is situated in circuit I; a fan 12 is situated in circuit II. as described above, the flow rates of flows 2 and 3 can be the same as each other, but can also differ from each other in controlled manner such that a residual flow rate has to discharged or supplied elsewhere.

Figure 3:
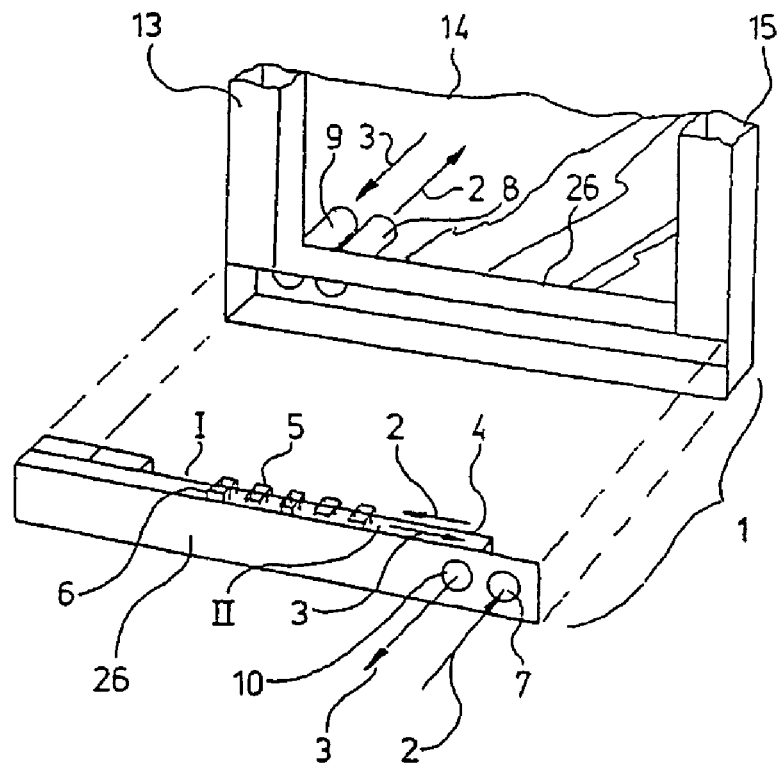
FIG. 3 shows a perspective view, partly drawn in exploded view, of a frame with the dewpoint cooler according to FIGS. 1 and 2.

As FIG. 3 shows, dewpoint cooler 1 is embodied as the lower border of a frame 13 which forms the framework for a window pane 14. In a particular embodiment one or more of the remaining borders 13,15 can also be embodied as a dewpoint cooler according to the invention. These dewpoint coolers 6, 13,14 etc. can be coupled to each other in modular manner and for instance have a number of passages and fans in common.

Figure 2:
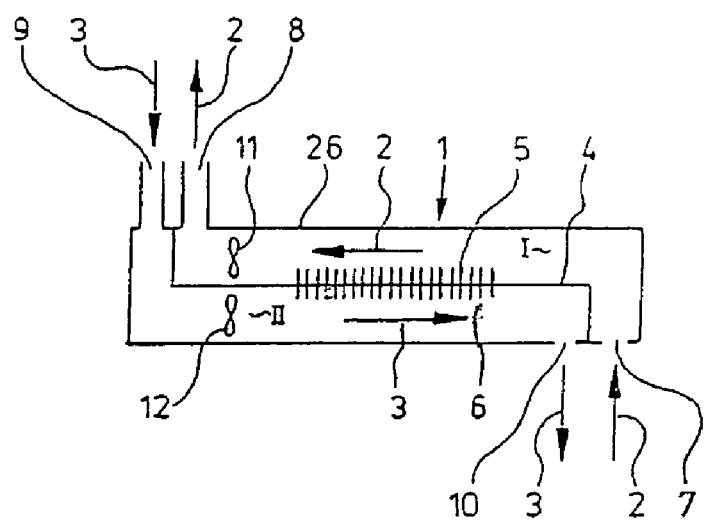
FIG. 2 shows a longitudinal section through the dewpoint cooler of FIG. 1.

It is pointed out emphatically that the construction shown in FIG. 2 is only very schematic and symbolic. A dewpoint cooler, or in the narrow sense a heat exchanger, will generally comprise a number of heat-exchanging walls with fins combined into a package. This real practical structure is omitted for the sake of clarity in the drawings.

Attention is further drawn to the fact that passages 8,9 and 10,7 do not necessarily have to be placed adjacently of each other, but can also be arranged spaced apart from each other. There is a smaller risk hereby of the flows 2 and 3 influencing each other. This can also be realized by jet-streams or nozzles with an angle differing from the drawn angles, optionally adjustable.

The dewpoint cooler according to FIG. 1 further comprises a solar panel 16 which can collect sunlight and convert it into electricity, which is used to charge a rechargeable battery (not shown) which is adapted to supply power to fans 11,12 via electronic means. Solar panel is accommodated in a protruding part 17 of housing 26, but can also form part thereof. The unit 16,17 is not shown in FIGS. 2 and 3.

Fins 6 and the surface of wall 4 directed toward the secondary circuit II are preferably treated such that the relevant surfaces are hydrophilic. By making use of the wetting means an effective wetting hereby takes place which brings about a cooling effect when airflow 3 is guided therealong. Via the heat transfer to the other side of wall 4 and fins 5, this cooling effect is converted into a cooling of primary airflow 2.

Figure 4:
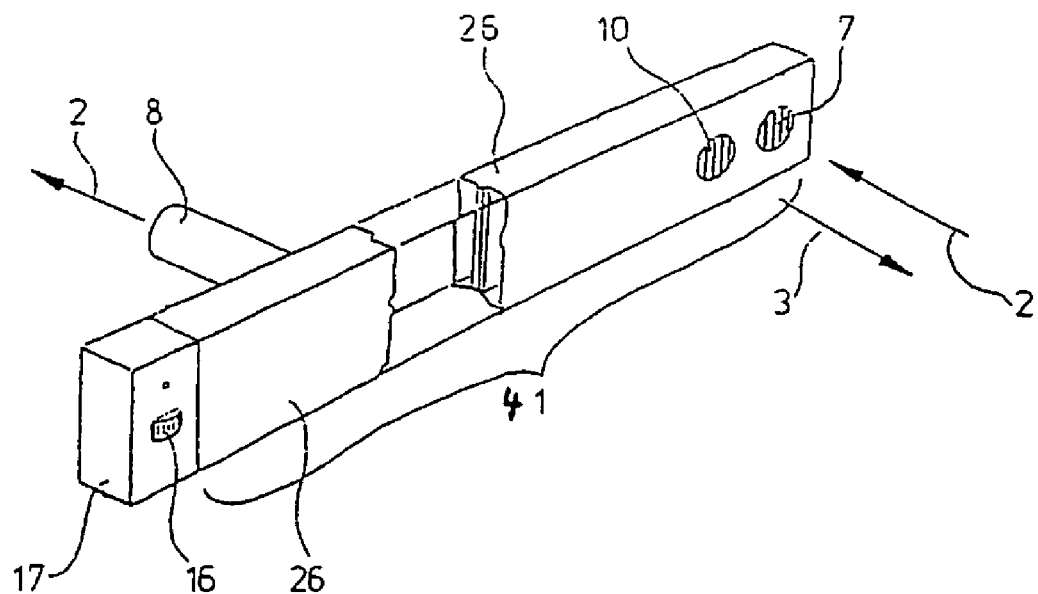
FIG. 4 shows a view corresponding with FIG. 1 of the dewpoint cooler according to the invention.

FIG. 4 shows a dewpoint cooler 41 according to the invention. The exterior differs from the heat exchanger 1 of FIG. 1 in the sense that it has only one outlet tube 8 on the inside of the building. This aspect will be further elucidated with reference to FIG. 5. The appearance is otherwise identical to that of heat exchanger 1.

Figure 5:
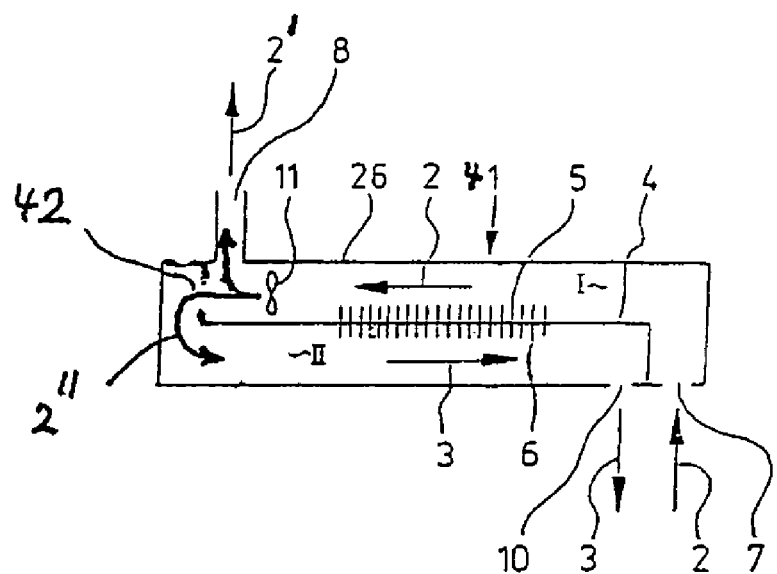
FIG. 5 shows a view corresponding with FIG. 2 of the dewpoint cooler according to the invention.

FIG. 5 shows very schematically the internal and functional structure of dewpoint cooler 41. Downstream of fan 11 the primary airflow 2 is split into two partial flows, viz. the outgoing cooled airflow 2' (for instance 70% of airflow 2) and a second branched flow 2'' of cooling air (for instance 30% of airflow 2) which is guided through an opening 42. The through-feed of opening 42 relative to the through-feed of passage 8 determines said ratio between flow rates 2'' and 2.

Not shown in the schematic view of FIG. 5 are the wetting means which serve to feed water for evaporation directly to a coating on secondary fins 6. This coating consists for instance of Portland cement with a thickness of 70 Am. The water supplied by feed conduits from a dispensing system makes the cement coating wet. The secondary airflow 3, which has a humidity of less than 100%, provides evaporation of the water on the relevant surface, this water in the form of water vapour in the secondary outlet airflow 3 being generated to the outside via opening 10. The heat extracted from fins 6, and thereby wall 4, due to the evaporation of the water is fed via fins 5 from the primary airflow 2, which is thereby cooled.

Figure 6:
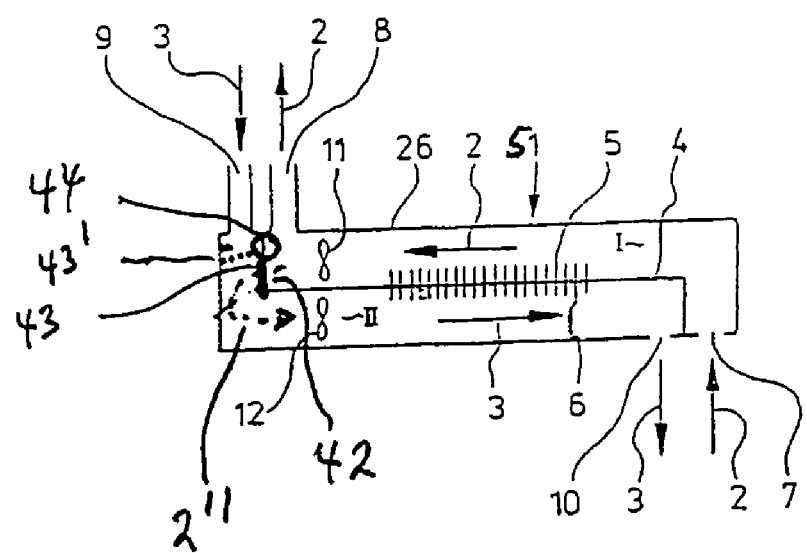
FIG. 6 shows a view corresponding with FIG. 2 of an alternative dewpoint cooler according to the invention.

FIG. 6 shows a hybrid embodiment of the dewpoint cooler according to the invention. Other than dewpoint cooler 41, this dewpoint cooler 51 is not provided with a fixed opening 42 downstream of fan 11, but with a valve 43 which can be displaced by an actuator 44 between the first position shown in full lines and the second position 43' shown in broken lines. In position 43 the airflow 2 is generated directly to the inside via passage 8, while in position 43' the valve 43 leaves opening 42 clear and closes passage 9. The same function is then thus obtained as in FIG. 5. In the first position the dewpoint cooler 51 can operate as heat exchanger for heat recovery. If desired, it could also function as cooler, although it is noted in this respect that in that case the ability to control the mutual ratio of flows 2 and 3 is less good. This is a drawback in the case the best possible efficiency is desired.

It is further noted that in order to reduce noise production the fans 11,12 can be spring mounted. Use can further be made of known acoustic damping means which can effectively reduce sound exiting via the housing and passages 8,9. In order to prevent resonance phenomena at the rotation frequency of the fans, the housing 6 can be manufactured from a material which strong internal damping or be provided with a bituminous inner layer, or a large mass, and thus have a great wall thickness.

Attention is finally drawn to the fact that in the case of a different placing of the passages it may be necessary to apply interlacing units and manifolds connecting the diverse passages to the sets of channels.

The invention claimed is:

1. Dewpoint cooler, comprising: a first air circuit and a second air circuit thermally coupled thereto via an at least partially heat-conducting wall, through which two circuits can flow two respective media, wherein at least the second medium contains a gas, for instance air, with a relative humidity of less than 100%; wherein the heat-conducting surfaces of said wall are at least partially covered in the area of the secondary medium with a hydrophilic, for instance hygroscopic coating, which coating is for instance porous and/or can absorb water by capillary action, retain it and relinquish it again through evaporation, such that the wetted coating, and thereby also the heat-conducting surfaces, are cooled; primary drive means based on pressure difference, for instance a fan or pump, for the primary medium; secondary drive means based on pressure difference, for instance a fan, for the secondary medium; and a wetting unit for subjecting the secondary medium to wetting by the water by evaporating liquid from the coating such that the evaporated liquid entrained by the secondary medium extracts heat from the primary medium via the heatconducting wall; characterized by said heat-conducting wall having break-up means such as fins for breaking up at least the thermal boundary layer, the laminar boundary layer and the relative humidity boundary layer at the position of at least active zones in both media for heat transfer, which break-up means comprise heatconducting protrusions which enlarge the effective heatconducting surface area of said wall; said break-up means also being at least partly covered in the area of the secondary medium with a hydrophilic, for instance hygroscopic coating, which coating is for instance porous and/or can absorb water by capillary action, retain it and relinquish it again through evaporation, such that the wetted coating, and thereby also the break-up means, are cooled; a housing in which the walls bounding the air circuits are accommodated, which housing is adapted as border or frame, or a part thereof for an outside door or outside window of a building, wherein the inlet of the primary circuit and the outlet of the secondary circuit are situated on the outside and the outlet of the primary circuit and the inlet of the secondary circuit are situated on the inside.

2. Dewpoint cooler as claimed in claim 1, wherein the coating consists of a porous technical ceramic material, for instance a burnt layer, a cement such as a Portland cement, or a fibrous material, for instance a mineral wool such as rockwool.

3. Dewpoint cooler as claimed in claim 1, comprising a reversing unit for reversing a part of the primary airflow at the outlet of the first air circuit in order to form the secondary airflow, wherein the primary drive means are also the secondary drive means.

4. Dewpoint cooler as claimed in claim 3, wherein the reversing unit can be switched off such that the two airflows can be separated and the wetting means can be switched off, this such that the dewpoint cooler can operate as heat exchanger for recovering heat discharged to the outside by the secondary airflow through transfer of heat in the heat exchanger to the primary airflow.

5. Dewpoint cooler as claimed in claim 3, wherein the ratio between the primary airflow and the secondary airflow can be adjusted by means of adjusting means such that the efficiency of the dewpoint cooler is adjustable.

6. Dewpoint cooler as claimed in claim 5, wherein the adjusting means are embodied as an optionally adjustable through-feed in the primary circuit and an adjustable through-feed in the secondary circuit.

7. Dewpoint cooler as claimed in claim 1, wherein the fans are at least partly powered by a rechargeable battery which is charged by a solar panel collecting sunlight from the outside.

8. Dewpoint cooler as claimed in claim 1, wherein a dewpoint cooler can be coupled in modular manner to a similar dewpoint cooler, for instance at an angle of 90.

9. Building with at least one door and/or one window with a frame, characterized in that at least one of the borders of this frame is embodied as a dewpoint cooler as claimed in any of the claims 1-8.

* * * * *